United States Patent [19]
Nobusawa

[11] 3,712,191
[45] Jan. 23, 1973

[54] ELECTRICAL CIRCUITRY FOR CONTROLLING CAMERA SHUTTERS

[75] Inventor: Tsukumo Nobusawa, Tokyo, Japan

[73] Assignee: Asahi Kogaku Kogyo Kabushiki Kaisha, Tokyo-to, Japan

[22] Filed: Nov. 30, 1971

[21] Appl. No.: 203,178

[30] Foreign Application Priority Data

Dec. 26, 1970    Japan..............................45/125252

[52] U.S. Cl. .............................95/10 CT, 95/53 EA
[51] Int. Cl............................G03b 7/08, G03b 7/62
[58] Field of Search.......95/10 CT; 307/109; 320/1 R

[56] References Cited

UNITED STATES PATENTS 3,641,890    2/1972    Ono..................................95/10 CT

Primary Examiner—Samuel S. Matthews
Assistant Examiner—Russell E. Adams, Jr.
Attorney—Steinberg & Blake

[57] ABSTRACT

A camera provided with electrical circuitry for controlling the shutter thereof. The circuitry includes a photosensitive circuit for generating a wave-shaped signal and a resonance circuit for temporarily storing the latter signal which is transmitted to the resonance circuit which resonates at the frequency of the latter signal. This frequency is determined by the light intensity, and the stored signal of the resonance circuit is used for controlling the duration of the interval during which the shutter is maintained open.

10 Claims, 12 Drawing Figures

PATENTED JAN 23 1973
3,712,191
SHEET 1 OF 2
FIG. 1A
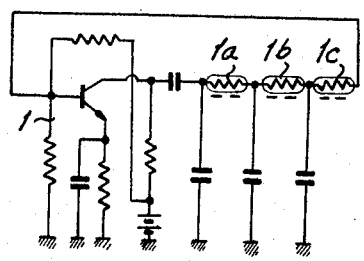
FIG. 1B
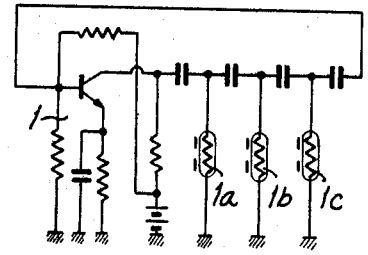
FIG. 2
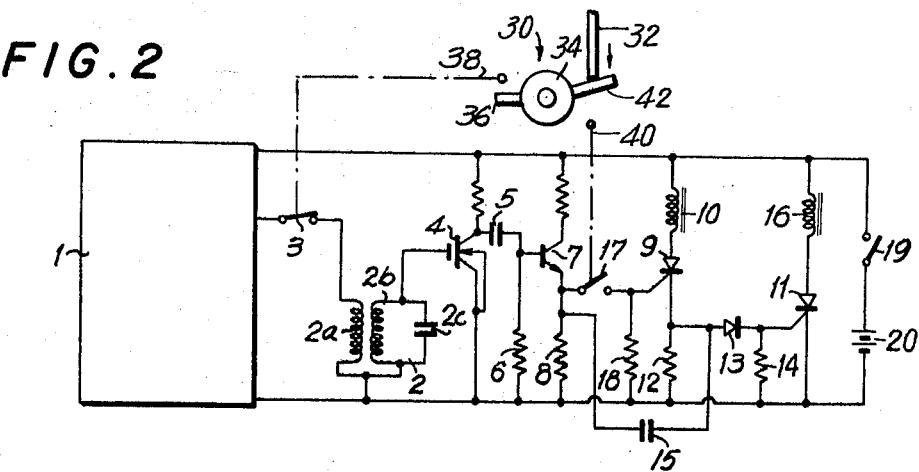
FIG. 3
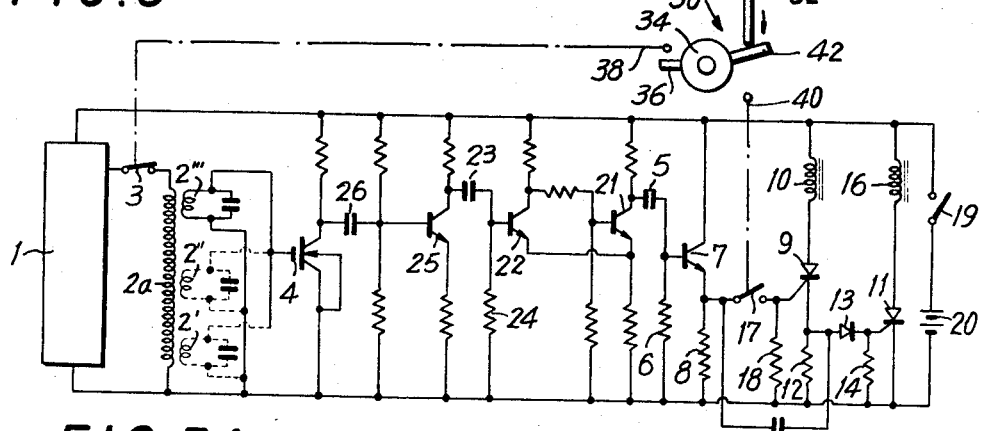

FIG. 3D
INVENTOR
TSUKUMO NOBUSAWA
BY
Steinberg and Blake
ATTORNEYS

ELECTRICAL CIRCUITRY FOR CONTROLLING CAMERA SHUTTERS

BACKGROUND OF THE INVENTION

The present invention relates to cameras.

In particular, the present invention relates to circuitry for automatically determining exposure time.

The present invention particularly relates to that type of camera where the shutter is electrically controlled in response to light which has already passed through the objective of the camera, so that automatic regulation is achieved with a through-the-lens type of light-measuring system. Thus, the present invention is particularly applicable to that type of camera where exposure time is determined at least in part in accordance with the intensity of light received by a photosensitive element located in the path of light traveling through the objective of the camera.

As is well known, this particular type of system is used in single lens reflex cameras, and thus the present invention is particularly designed for incorporation into this type of camera.

One of the drawbacks encountered with cameras of this type is that when the mirror swings up just prior to exposure of the film, there is an inevitable disturbance in the internal resistance of the photosensitive element. In order to avoid this drawback it has been proposed to temporarily store the information corresponding to the intensity of the light, with control of the shutter being derived from this stored information. In general it is customary to utilize a capacitor in order to store the signal corresponding to light intensity. However, many difficulties are encountered in storing this information with a capacitor and in transmitting the store information to a switching circuit which controls the shutter. It is conventional to use a change-over switch for such purposes, but this expedient has the disadvantage of producing undesirable effects such as vibrations or chattering. In addition, conventional shutters operated with electrical controls of the D.C. type subject to the influence of ambient temperatures, and it is difficult for the electrical shutter-controlling structure to achieve the required controls of the exposure time because of the variations introduced into the stored information as a result of changes in ambient temperature. Because of these latter factors control of electrically operated shutters with a through-the-lens light measuring system employing capacitors for memory purposes have not been widely used in practice. On the other hand, there has been a rapid progress in the development of electrically controlled shutters utilizing through-the-lens light measuring systems where the controls utilize a so-called selective time resistance in which the factor of the intensity of the light at the object to be photographed is temporarily converted into a time resistance.

SUMMARY OF THE INVENTION

It is a primary object of the present invention to provide electrical shutter controls which will avoid all of the above drawbacks by utilizing a different type of memory system so that the signals which correspond to the light intensity can be very reliably stored without utilizing capacitors.

A further object of the present invention is to provide a memory system for circuitry of the above type which is highly reliable in operation.

In particular it is an object of the present invention to provide a memory system for storing a signal corresponding to light intensity with this memory system of the invention being free of problems such as chattering or vibration due to switch operation and having a durability greater than that encountered with conventional circuits utilizing change-over switches.

Also it is an object of the present invention to provide a circuit which will enable the range of shutter operation to be increased as compared to conventional circuits.

In addition it is an object of the present invention to provide shutter controls of extreme accuracy irrespective of the particular exposure time.

In addition it is an object of the invention to provide a structure of the above type which is exceedingly simple and relatively inexpensive and at the same time capable of being used in so-called selective timer resistance types of circuits.

Thus, it is an object of the invention to provide circuitry which will enable time resistances to be effectively selected according to the number of grades of light values.

Yet another object of the present invention is to provide a circuit which will be free of influence resulting from variations in ambient temperatures.

According to the invention the circuitry includes a photosensitive means for generating a wave-shaped signal whose frequency is determined by the light intensity, so that this signal of the A.C. type is used for controlling the shutter. A resonance circuit means is electrically connected with the latter photosensitive means for temporarily storing the signal with the resonance circuit means resonating at the frequency of the signal. A shutter-operating means is electrically connected with the resonance circuit means for operating the shutter in such a way that the exposure time is determined at least in part by the period of the wave-shape signal.

BRIEF DESCRIPTION OF DRAWINGS

The invention is illustrated by way of example in the accompanying drawings which form part of this application and in which:

FIG. 1A shows one embodiment of a photosensitive means of the invention for generating a wave-shaped signal;

FIG. 1B shows another embodiment of a photosensitive means of the invention for generating a wave-shaped signal;

FIG. 2 is a schematic wiring diagram of one embodiment of the invention;

FIG. 3 is a schematic wiring diagram of another embodiment of the invention;

FIGS. 3A–3D respectively illustrate curves showing the shapes of waves resulting from operation of the circuitry of FIG. 3;

DESCRIPTION OF PREFERRED EMBODIMENTS

Figure 3A:
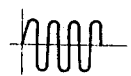

Referring first to FIG. 1A, there is illustrated therein a photosensitive means for generating a wave-shaped signal which in the illustrated example will have the configuration of a sine wave. The photosensitive means illustrated in FIG. 1A is a phase-shifting RC oscillation circuit of the parallel capacitor type. In this circuit, however, the resistors are replaced by photoconductors $1a$, $1b$, and $1c$, these photoconductors being situated in the path of light which travels through the objective of the camera so as to receive the light from the object to be photographed after this light has passed through the objective of the camera.

FIG. 1B illustrates another embodiment of a photosensitive means for generating a wave-shaped signal. This embodiment of the photosensitive means is a phase-shifting RC oscillation circuit of the parallel resistor type. In this circuit also the resistors are respectively replaced by photoconductors $1a$, $1b$, and $1c$, with the latter also located in the path of light from the object to be photographed for receiving this light after it has passed through the objective of the camera.

The above-described photosensitive means of FIG. 1A and FIG. 1B will generate, in response to receiving of light by the photoconductors, a signal having the shape of a sine wave.

Referring to FIG. 2, which illustrates a simplified embodiment of the invention, it will be seen that the photosensitive means 1, which may have the construction either of the embodiment of FIG. 1A or the embodiment of FIG. 1B, is electrically connected through a normally closed switch 3 to a resonance circuit means 2 which serves to store the signal generated by the photosensitive means 1. Thus the resonance circuit means 2 serves as a memory mechanism. This resonance circuit means 2 of the invention includes the induction coils $2a$ and $2b$. A capacitor $2c$ is connected in parallel with the induction coil $2b$, and the induction coil $2a$ induces the sine wave information. The resonance takes place in the components $2b$ and $2c$. Through the switch 3 the sine wave generated by the photosensitive means 1 is transmitted to the resonance circuit means 2. The switch 3 will be opened just prior to upward swinging of the quick-return mirror which is conventional in single lens reflex cameras. Thus, when this mirror is in its lower position it directs an image of the object to be photographed to the viewfinder and at the same time light is received by the photosensitive means 1. Upon swinging up of this mirror the film will be exposed and at this time the signal stored by the resonance circuit means 2 will be used to control the duration of the interval during which the shutter is maintained open. The switch 3 is opened and closed in connection with operation of a manually operable shutter-actuating means 30 which includes the diagrammatically illustrated shutter release button 32 which is depressed by the operator through a given distance in order to bring about actuation of the shutter. As is schematically illustrated in FIG. 2, the button 32 when depressed through a given distance will rotate a cam 34. This cam 34 has a projection 36 which engages a linkage 38 extending to the switch 3, as schematically illustrated, so that through the linkage 38 and the cam projection 36 the switch 3 will be displaced from its normally closed position to an open position during a first part of the distance through which the manually operable means 30 is displaced by the operator. Thus, during the first half step of shutter release movement the switch 3 will be opened, and this opening movement may take place simultaneously with upswinging of the mirror.

Because the switch 3 is in the circuit connecting the photosensitive means 1 to the resonance circuit means 2, the transmission of the sine wave signal to the resonance circuit means 2 is temporarily interrupted upon opening of the switch 3.

The resonance circuit means 2 is electrically connected with a field effect transistor 4 having its input or first gate connected to the resonance circuit means 2 and its output or drain electrically connected to a differentiating circuit formed by a capacitor 5 and a resistor 6 which are connected in series. The terminal voltage of the resistor 6 is arranged in such a way as to form directly a bias voltage for a buffer transistor 7. An emitter resistor 8 is electrically connected to the transistor 7 so that the voltage generated through the emitter resistor 8 forms the gate voltage of a silicon control rectifier element (SCR) 9 for determining opening of the shutter. The opening of the shutter, after it is cocked, is determined by release of a leading curtain of the shutter, as is well known, and this release of the leading curtain is brought about by an electromagnet 10. When the latter is actuated by the SCR 9 the leading curtain is released to open the shutter and start exposure of the film. The electromagnet 10 is connected to the anode of the SCR 9, and this SCR 9 forms together with the electromagnet 10 and a second SCR 11 as well as a further electromagnet 16 a shutter-operating means. This shutter-operating means will determine the interval during which the shutter remains open. The cathode of the SCR 9 is connected to a gate voltage generator circuit for the SCR 11 of the following state. The gate voltage generator circuit is formed by a diode 13 and a resistor 14 which are connected in series, the resistor 14 forming a gate resistor of the SCR 11, and the series connected diode 13 and resistor 14 are in parallel with a cathode resistor 12 of the SCR 9 so that the voltage generated through the gate resistor 14 is used as the gate voltage for the SCR 11. A capacitor 15 is connected between the cathode of SCR 9 and the emitter of transistor 7. The electromagnet 16 controls closing of the shutter since through this electromagnet 16, as controlled by the SCR 11, the trailing curtain of the shutter will be released to follow the leading curtain so as to terminate the exposure as is well known. This electromagnet 16 is connected to the anode of SCR 11.

In order to render the shutter-operating means 9–16 operative, a normally open switch 17 is closed. The switch 17 determines the instant when the shutter is released to start the exposure. The normally open switch 17 is connected through a schematically illustrated linkage 40 to an element situated in the path of movement of a second camming projection 42 of the cam 34. Thus, during a second part of the distance through which the shutter button 32 is depressed and the cam 34 is turned, or in other words during the second half of the distance through which the shutter button 32 is depressed, the cam projection 42 will engage the linkage 40 so as to act through the latter to close the switch 17, and in this way the normally closed switch 3 is opened during the first half of depression of shutter button 32 and the normally open switch 17 is closed during the second half of depression of the shutter-operating button 32. Thus, upon closing of the switch 17 the information which is stored by the resonance circuit means 2 which serves as a memory mechanism in accordance with the invention is transmitted through the gate resistor 18 to the SCR 9.

The illustrated circuit is completed by a power source 20 and a switch 19 which is closed in order to energize the entire circuit.

Upon closing of the switch 19, prior to opening of the shutter, the sine-wave signal from the sine-wave generating photosensitive means 1 is transmitted to the induction coil 2a. As a result the resonance circuit 2 is brought into its resonant state. The resonance circuit 2 resonates with the frequency of the generated sine wave, and this frequency has a period which corresponds to the magnitude of the light intensity at the object to be photographed. Depression of the shutter release button 32 at this time during the first half of the distance through which it is moved brings about opening of the switch 3 so as to interrupt the transmission of the sine-wave signal to the resonance circuit means 2. The continued depression of the shutter button 32 brings about during the second half of the movement thereof closing of the switch 17 to thereby render the shutter-operating means operative to open and close the shutter.

Figure 5A:
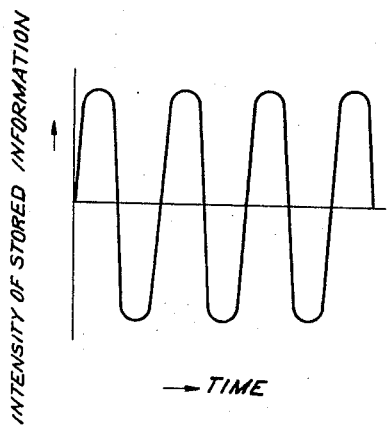
FIG. 5A illustrates a sine wave signal generated by the photosensitive means of the invention.
Figure 5B:
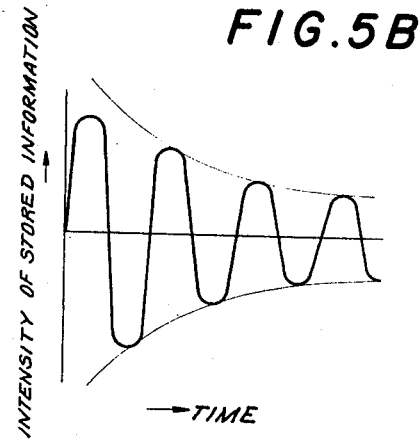
FIG. 5B illustrates attenuation of the signal of FIG. 5A.

The resonance circuit means 2 functions so as to store the sine-wave signal temporarily after the switch 3 is opened, as is illustrated in FIGS. 5A and 5B. Thus, as may be seen from FIG. 5A, the stored signal will have the configuration of a sine wave if it is assumed that the resonance circuit means 2 has no resistance. Actually, because of the unavoidable resistance which is present in the resonance circuit means 2, the signal is attenuated in the manner illustrated in FIG. 5B, because of this resistance factor which is present in the resonance circuit means. In actual practice, however, this attenuation creates no problem because the duration of the operation of the resonance circuit means for memory or storing purposes need only amount to a total of one-sixtieth sec., corresponding to the shutter time, and approximately one one-hundredth sec., which is the interval from the instant when the mirror swings up to the instant when the shutter actually opens. Thus, assuming an average exposure time of one-sixtieth sec. and an interval of one one-hundredth sec. between swinging up of the mirror and actual opening of the shutter, the temporary storage of the signal by the resonance circuit means need only be slightly greater than the total of the latter time intervals, so that attenuation as illustrated in FIG. 5B does not create any problem in the operation of the circuitry of the invention.

As an alternative, the stored information may be amplified by utilizing such means as an amplifier to avoid an undesirable attenuation of the stored signal. In addition, it is to be noted that a greater or lesser extent of attenuation of the stored signal does not introduce any error into the exposure time since, in the particular embodiment illustrated, the exposure time is regulated not by the amplitude of the signal but by the period of the stored signal.

The field effect transistor, upon opening of the switch 3, is brought into its state of conductivity or continuity by the stored signal, and then the stored signal is differentiated by the capacitor 5 and the resistor 6 so as to be converted into a signal in the form of sharp pulses.

Upon closing of the switch 17 the first pulse is transmitted to the gate of SCR 9, which becomes conductive by changing over to its state of continuity and brings about opening of the shutter by way of the electromagnet 10.

At this time SCR 11 which controls closing of the shutter has its operating voltage accumulated by the gate voltage generating circuit 12–14 up to a given magnitude which is not sufficient to render the SCR conductive so that it does not yet reach its state of continuity. The SCR is merely shifted into a state in preparation for continuity.

SCR 11 only becomes conductive by reaching its state of continuity when the second pulse of the signal is transmitted to the gate voltage generating circuit 12–14 with the interval from the first to the second pulse corresponding to the period of the sine-wave information which is stored by the resonance circuit means 2. As a result closing of the shutter is brought about by way of the electromagnet 16, with the interval during which the shutter is maintained open being determined at least in part by the period of the sine-wave signal generated by the photosensitive means 1 and stored by the resonance circuit means 2. Suitable parts of the circuitry may be adjusted in accordance with the speed of the film and the size of the aperture, as is well known, so that these latter factors together with the interval from one pulse to the next transmitted to the shutter-operating means 9–16 will determine the actual exposure time. These factors of film speed and aperture size of the diaphragm can be introduced into the circuit in a well known manner through a suitable variable resistor.

A constant-voltage element or the like may be connected in parallel with the emitter resistor 8 of the transistor 7 in the event that the second pulse of the transmitted signal is so high that there is a danger that SCR 11 will be shifted to its state of continuity by the first pulse.

Thus, with the above embodiment of the invention not only is it possible to regulate the exposure time with the period of the sine wave signal which corresponds to the intensity of the light at the object to be photographed, but in addition it is possible to provide a memory means for the through-the-lens light measuring system by way of the resonance circuit means 2.

The embodiment of the invention which is illustrated in FIG. 3 represents a modification of FIG. 2 which improves the precision of the operation of the circuitry of the invention. Those parts of the embodiment of FIG. 3 which correspond to those of FIG. 2 are indicated by the same reference characters.

In the embodiment of FIG. 3, use is made of a composite resonance circuit in order to provide the memory mechanism, and this resonance circuit means of the embodiment of FIG. 3 brings about a broadening of the range of shutter time. In addition the circuitry of FIG. 3 functions to shape the initial sine-wave signal to achieve synchronous pulses which will minimize possible errors in determination of the exposure time.

Referring to FIG. 3, the resonance circuit means of this embodiment includes the resonance circuits 2', 2'', and 2''' which are connected in parallel so that the frequency band of the stored information or signal can be broadened. This result is illustrated in FIGS. 4A and 4B. FIG. 4A illustrates the characteristic curve of the operation of the resonance circuit means of FIG. 2. Thus with the single resonance circuit of FIG. 2 an operation as illustrated in FIG. 4A will be achieved. On the other hand, with the resonance circuit means of FIG. 3, the frequency band is far wider, FIG. 4B illustrating the wider frequency band which is achieved with the resonance circuit means of FIG. 3. This characteristic is similar to that of a stagger tuning device.

In the circuitry of FIG. 3 the transistors 21 and 22 form part of a Schmitt circuit, and an additional differentiating circuit is provided by way of the capacitor 23 and the resistor 24 as well as a buffer transistor 25. The latter differentiating circuit is connected to the input of the Schmitt circuit so as to form a wave-shaping circuit. The signal which is stored by the memory mechanism formed by the resonance circuit means of FIG. 3 is transmitted through a coupling capacitor 26 from the output or drain of the field effect transistor 4 to the wave-shaping circuit means 23–25.

Figure 3B:
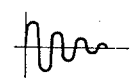
Figure 3C:
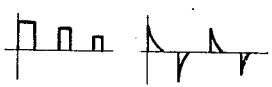
Figure 4A:
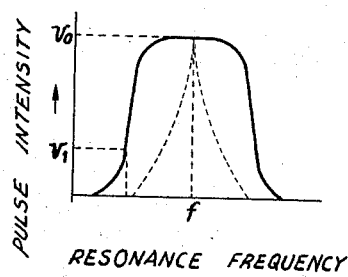
FIG. 4A is a graph illustrating the operation of a resonance circuit of FIG. 2.
Figure 4B:
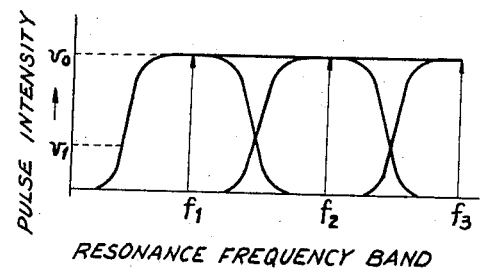
FIG. 4B is a graph illustrating the operation of a resonance circuit of FIG. 3.

Thus, with the embodiment of FIG. 3, the wave-shaped signal generated by the photosensitive means 1 is transmitted through the normally closed switch 3 to the resonance circuit means of FIG. 3 which differs from that of FIG. 2 in the manner described above, and this signal will initially have the sine-wave configuration shown in FIG. 3A, with attenuation taking place as illustrated in FIG. 3B due to the inherent resistance of the resonance circuit means of FIG. 3. The signal transmitted through the field effect transistor 4 and the coupling capacitor 26 to the wave-shaping circuit means 23–25 is shaped by the latter into the square pulses illustrated in FIG. 3C. The signal in the form illustrated in FIG. 3C is then further shaped by the differentiating circuit means 5, 6 so as to have the sharp pulse configuration illustrated in FIG. 3D, and it is signals as shown in FIG. 3D which control the opening and closing of the shutter in the manner described above in connection with FIG. 2, the shutter-operating means of FIG. 3 being identical with and operating in the same way as the shutter-operating means of FIG. 2, and the switches 3 and 17 of FIG. 3 being operated in the same way as the switches 3 and 17 of FIG. 2. Thus, except for the above differences the embodiment of FIG. 3 will operate in the same way as FIG. 2. However with FIG. 3 the exposure time is accurately regulated by the leading or trailing edge of a square pulse, thus minimizing errors in exposure time.

Generation of the sine-wave signal which has a period corresponding to the light intensity of the object to be photographed, this generation taking place at the photosensitive means 1, may be expressed by numerical equations in the following manner:

With the embodiment of FIG. 1A, the sine-wave signal will be generated by conversion from the light intensity of the object to be photographed, according to the following:

$$f = \sqrt{6/2\pi RC}$$

and $T = KRC$
where $\begin{cases} f: \text{generation frequency,} \\ T: \text{period, and} \\ k = 2\pi/\sqrt{6} \end{cases}$ With the device of FIG. 1B, the following relationships are present:

$$f = 1/2\pi \sqrt{6RC}$$

and $T = KRC$
where
$\begin{cases} f: \text{generation frequency,} \\ T: \text{period, and} \\ K = 2\pi \sqrt{6} \end{cases}$ As is apparent from the above relationships, both of the photosensitive means of FIGS. 1A and 1B will generate sine-wave signals where the period will correspond to the light intensity of the object to be photographed.

With respect to the manner in which the stored signal is attenuated at the resonance circuit means, it will be assumed that there is a resistance factor $R$ in the resonance circuit, and the resonance current $i$ may be expressed by:

$$i = (E/\omega fL)e^{-t/\tau e} \sin \omega ft \qquad (1)$$

where
$LC$: inductance and capacitor in the resonance circuit,
$\begin{cases} \omega f: \text{resonance angular frequency,} \\ E: \text{energized voltage, and} \\ \tau e: \text{time constant of attenuation curve.} \end{cases}$ There is established, therefore, the following relations:

$$\omega f = \sqrt{1/LC - (R/2L)^2} \qquad (2)$$

$$\tau e = 2L/R \qquad (3)$$

In the above, equation (2) is a constant at the resonance point. Since a relation $(1/\omega fL) \times \sin \omega ft = A$ is obtained, the equation (1) will be transformed to:

$$i = AE^e{}^{-t/\tau^e} \qquad (4)$$

Equation (4) indicates that the resonance current is proportional to $E$, so that in order to increase $i$ it is only necessary to amplify $E$. Furthermore, the term $e^{-t/\tau e}$ in equation (4) may be increased by increasing the value of $\tau e$. For this purpose, a smaller value may be selected for $R$ while a larger one is selected for $L$ in such a manner as to maintain the relation $\tau e = 2L/R$ which is obtained from equation (3). Thus, control of shutter opening and closing may be accomplished by making the value of the signal or information stored in the memory mechanism with proper selection of the values of $E$, $R$, and $L$.

Thus, with the present invention, as is apparent from the above description of the embodiments of FIGS. 2 and 3, the photosensitive means 1 is adapted to convert the light intensity of the object to be photographed into the sine-wave signal where the period will correspond to the light intensity at the object to be photographed, and this signal will be reliably stored by the memory mechanism formed by the resonance circuit means which resonates with the frequency of the sine-wave signal which is generated by the photosensitive means 1. As a result it becomes practical to use these resonance circuits of the invention for the purpose of storing the signals, as a memory mechanism, with electrically controlled shutters where the light is measured after passing through the objective of the camera. The particular resonance circuit means of the invention is of great advantage, as compared with capacitors which are used for this purpose according to the prior art, in that the resonance circuit of the invention is free from problems such as vibration or chattering in the operation of switches and is of a superior durability to capacitors. Particularly with the embodiment of FIG. 3 where the memory mechanism is formed by a plurality of resonance circuits, the range of exposure time may be considerably broadened. In addition, by including the wave-shaping circuit means 23-25 of FIG. 3, the pulse signals used to control opening and closing of the shutter are produced only after the signal temporarily stored by the resonance circuit means has been shaped into square pulses, so that with this particular embodiment an extremely high degree of accuracy may be achieved in the regulation of the exposure time under all conditions independently of the particular exposure time which is used, so that either an exposure time of long duration or short duration may be freely used with great advantage with the embodiment of FIG. 3.

As is apparent from the above description, conventional electrical shutter controls with through-the-lens type of light-measurement is inferior from a practical standpoint but may be very greatly improved with great practical advantage by incorporating the resonance type of memory mechanism of extremely simple construction, according to the present invention. Inasmuch as a sine-wave type of signal is the preferred wave shape according to the invention, frequency demultiplication and multiplication become possible by utilizing demultiplication and multiplication circuits which are well known. Phenomena of this latter type may be utilized to broaden the range of the exposure time and to control exposure factors such as film speed. In addition, utilization of the principle of the memory mechanism formed by a resonance circuit according to the present invention enables electrical shutter controls with through-the-lens type of light measurement to be arranged in a so-called circuit of the selective timer resistance type. In this latter case, the time resistances may be effectively selected by providing resonance circuits of sharp resonance characteristics where the number of these circuits equals the number of different grades of light value. Although the information converted from light intensity at the object to be photographed has been indicated above as being utilized to generate a signal having the configuration of a sine wave, this has been done primarily for the purpose of convenience explaining the invention with the above embodiments. It is equally possible to use A.C. electrical signals substantially similar to sine-wave signals instead of the sine-wave signals referred to above. In addition, the factor of the light intensity at the object to be photographed may be added to the circuit subsequent to generating a signal of a predetermined frequency during conversion of an A.C. electrical signal. It is also possible to provide the reverse of this situation by having the generated signal added to a signal after conversion from the light intensity at the object to be photographed.

What is claimed is:

1. In a camera, photosensitive means for receiving light from an object to be photographed and for generating in response to said light a wave-shaped electrical signal the frequency of which is determined by the intensity of said light, resonance circuit means electrically connected with said photosensitive means for resonating with said frequency and for temporarily storing said signal, and electrical shutter-operating means electrically connected to said resonance circuit means to be operated thereby for opening a shutter of the camera for an interval whose duration is determined at least in part by the period of said signal.

2. The combination of claim 1 and wherein a normally closed switch means electrically connects said photosensitive means with said resonance circuit means and a normally open switch means forms part of said shutter-operating means for rendering the latter operative when said normally open switch means is closed, and manually operable shutter-actuating means movable through a given distance and operatively connected with said normally closed switch means for opening the latter during movement through a first part of said distance and operatively connected with said normally open switch means for closing the latter during movement through a second part of said distance.

3. The combination of claim 2 and wherein said photosensitive means generates a signal having the configuration of a sine wave, and means connected between said resonance circuit means and said normally open switch means for converting the signal stored by said resonance circuit means into sharp pulses.

4. The combination of claim 3 and wherein said shutter-operating means includes first and second SCR means electrically connected with said normally open switch means to be rendered operative upon closing of the latter in a sequence according to which said second SCR means operates subsequent to said first SCR means after an interval determined at least in part by the period of said signal, and a pair of electromagnet means electrically connected with said first and second SCR means to be operated thereby for opening the shutter in response to operation of said first SCR means and for closing the shutter in response to operation of said second SCR means.

5. The combination of claim 1 and wherein said photosensitive means includes a phase-shifting RC oscillation circuit of the parallel capacitor type having resistors in the form of photoconductors.

6. The combination of claim 1 and wherein said photosensitive means includes a phase-shifting RC oscillation circuit of the parallel resistor type wherein the resistors are in the form of photoconductors.

7. The combination of claim 1 and wherein said resonance circuit means includes a single induction coil and capacitor connected in parallel.

8. The combination of claim 1 and wherein said resonance circuit means includes a plurality of induction coils and a plurality of capacitors respectively connected in parallel with said induction coils.

9. The combination of claim 8 and wherein a normally closed switch means is connected between said photosensitive means and said resonance circuit means and a normally open switch means forms part of said shutter-operating means, and manually operable shutter-actuating means movable through a predetermined distance and operatively connected with said normally closed switch means for opening the latter during a first part of said distance and operatively connected with said normally open switch means for closing the latter during a second part of said distance, to render said shutter-operating means operable upon closing of said normally open switch means.

10. The combination of claim 9 and wherein a waveform shaping circuit means is electrically connected between said resonance circuit means and said normally open switch means for forming the signal temporarily stored by said resonance circuit means into square pulses and for then forming the latter pulses into sharp pulses used for controlling the shutter upon closing of said normally open switch means.

* * * * *